United States Patent
Shimada (10) Patent No.: US 8,045,309 B2
(45) Date of Patent: Oct. 25, 2011

(54) MAGNETIC ENERGY RECOVERY SWITCH HAVING PROTECTIVE CIRCUIT

(75) Inventor: Ryuichi Shimada, Tokyo (JP)

(73) Assignee: MERSTech, Inc., Tokyo (JP)

( * ) Notice: Subject to any disclaimer, the term of this patent is extended or adjusted under 35 U.S.C. 154(b) by 0 days.

(21) Appl. No.: 12/601,657

(22) PCT Filed: Feb. 20, 2008

(86) PCT No.: PCT/JP2008/053340
§ 371 (c)(1),
(2), (4) Date: Nov. 24, 2009

(87) PCT Pub. No.: WO2009/104277
PCT Pub. Date: Aug. 27, 2009

(65) Prior Publication Data
US 2011/0032652 A1 Feb. 10, 2011

(51) Int. Cl.
*H02H 3/08* (2006.01)
(52) U.S. Cl. .................................. 361/93.1; 361/91.1
(58) Field of Classification Search .................. 361/91.1
See application file for complete search history.

(56) References Cited

U.S. PATENT DOCUMENTS

| | | | |
|---|---|---|---|
| 4,902,954 A * | 2/1990 | Oshima et al. | 318/762 |
| 6,856,283 B2 * | 2/2005 | Jacobson et al. | 342/368 |
| 2004/0246641 A1 | 12/2004 | Sugimoto et al. | |
| 2008/0007190 A1 * | 1/2008 | Kunii et al. | 318/141 |

FOREIGN PATENT DOCUMENTS

| | | |
|---|---|---|
| JP | H07-065988 A | 3/1995 |
| JP | 2000-236679 A | 8/2000 |
| JP | 2000-358359 A | 1/2001 |
| JP | 2004-260991 A | 9/2004 |
| JP | 2006-109583 A | 4/2006 |

OTHER PUBLICATIONS

Narushima, J.;Inoue, K.; Takaku, T.; Isobe, T.; T;Shimada,R.; Application of magnetic energy recovery switch(MERS) for power factor correction IPEC-Niigata 2005,Apr. 4-8, 2005, Japan.

Isobe, T.; Wiik,J.A.; Wijaya, F.D.; Inoue, K.; Usuki, K.; Kitahara, T.; Shimada, R.; Improved Performance of Induction Motor Using Magnetic Energy Recovery Switch Power Conversion Conference—Nagoya, 2007. PCC'07 Publication Year: 2007, pp. 919-9204.

German Patent Office Action to the corresponding case dated Mar. 14, 2011 with Translation.

* cited by examiner

*Primary Examiner* — Rexford Barnie
*Assistant Examiner* — Tien Mai
(74) *Attorney, Agent, or Firm* — Keiji Masaki; International Knowledge Asset Office (57) ABSTRACT

In order to protect Magnetic Energy Recovery Switch (MERS) against an overvoltage and an overcurrent a voltage detection unit is provided for detecting the capacitor voltage of the MERS and control means is provided to control so as to turn ON the switch of the discharge circuit connected in parallel with the capacitor to make the capacitor discharge the electric charge thereof when the output of the voltage detection unit exceeds a predetermined value. Moreover, a current detection unit is interposed between the AC power supply and the load for detecting the current flowing to the load, and the current limiting is carried out by making the duty ratio of the ON/OFF of the pulse of the gate control signals of the MERS switches smaller than 0.5, when the output of the current detection unit exceeds a predetermined value.

19 Claims, 7 Drawing Sheets

Fig.1

PRIOR ART

MAGNETIC ENERGY RECOVERY SWITCH HAVING PROTECTIVE CIRCUIT

TECHNICAL FIELD

The present invention relates to a magnetic energy recovery switch connected between an AC power supply and a load and having a protective circuit for protection of reverse-conductive type semiconductor switches constituting the magnetic energy recovery switch against overvoltage and for protection of semiconductor switches and a load against overcurrent.

BACKGROUND ART

Nowadays electric power energy systems are critically important social infrastructure which cannot be stopped even for a moment. However, in an abnormality or a trouble of a load that causes an overcurrent, a measure taken thereagainst is a high-speed breaking of the load, as is exercised by a fuse or a high-speed mechanical switch. Nevertheless, there has been a demand for a highly functional switch, so called a controller or a current limiter, which is capable of limiting only the overcurrent and allowing a continued operation without the complete stop of the load, as well as a system recovery to a full operation after the return to its normality.

Electric power system must be designed to withstand a short-time overcurrent that can be caused due to such as a rush current of an incandescent lamp being lit, a start-up rush of an induction motor or an initial excitation inrush of a transformer. It is important to distribute yield capacity of each machine appropriately. A semiconductor-type inverter power supply in recent years, such as a fuel cell inverter, for example, cannot withstand, in many cases, a peak current which is almost ten times the excitation inrush current of a transformer. Inverter power supplies, therefore, have various soft-start functions, which work if there is one load for one inverter power supply but may not work for late-started ones of a plurality of loads connected to one inverter power supply.

Electric power systems are designed in consideration of protective coordination, the current and the duration thereof to withstand an accidental, short-time overcurrent. However, such systems merely perform a protective coordination aimed at a prevention of the influence over the upstream by selectively breaking the accident current by a switch. It is a recent social demand to achieve a continuous operation as far as possible without power breaking if the accident has taken place in the downstream of a system.

As for a current limiter which limits an accident current with series elements, an application based on a transient phenomenon between superconductive mode and normal conductive mode is developed. This is for size and cost reduction of the breaker, whose required capacity is extremely large when the accident current is excessively large: such size and cost reduction can be attained if only the accident current is reduced into the half or so by the current limiter.

In the case of a three-phase transformer, an exciting rush current due to iron core saturation is expected. Therefore, it is necessary that such transformers be constructed to possess an overcurrent withstand capacity against electromagnetic force of the electric wire.

DISCLOSURE OF INVENTION

Problem to be Solved by the Invention

Magnetic energy recovery switch is a switch which can control electric power between an AC power supply and a load. The magnetic energy recovery switch has a structure of switches which are turned ON/OFF independently by four gate signals, and can store in a capacitor and regenerate magnetic energy of a load. It is already patented and disclosed (see Japanese Patent No. 3634982) that various electric power controls are possible by making a voltage automatically generated in a capacitor to generate a reactance voltage. It is a characteristic of this switch that the lead of phase of the current is achieved by control of the opposed pair of four reverse-conductive type semiconductor switches connected in a bridge structure so that these diagonally opposed pairs turn ON and OFF alternately by being supplied with their respective gate on signals turned ON and OFF in synchronization with the supply voltage. Also it is a characteristic that the voltage across the load can be heightened and lowered by the phase-lead of the current in an inductive load.

When too much magnetic energy caused by an overcurrent of a load is regulated by a normal operation of these reverse-conductive type semiconductor switches, it may result in that an unexpectedly large level of magnetic energy is recovered, and the level may exceed the withstand voltage of the capacitor and/or the withstand capacity for the current and voltage of the reverse-conductive type semiconductor switches. In this instance, if the reverse-conductive type semiconductor switches can be protected immediately, such protection will also protect the load and the power supply. This suggests the significance of the switch protection functionality, and at the same time implies its another importance for achieving the downsized, low-cost switch, which will be attained when the switch itself is free of a overload capacity requirement as a result of the above protection capability.

Figure 1:
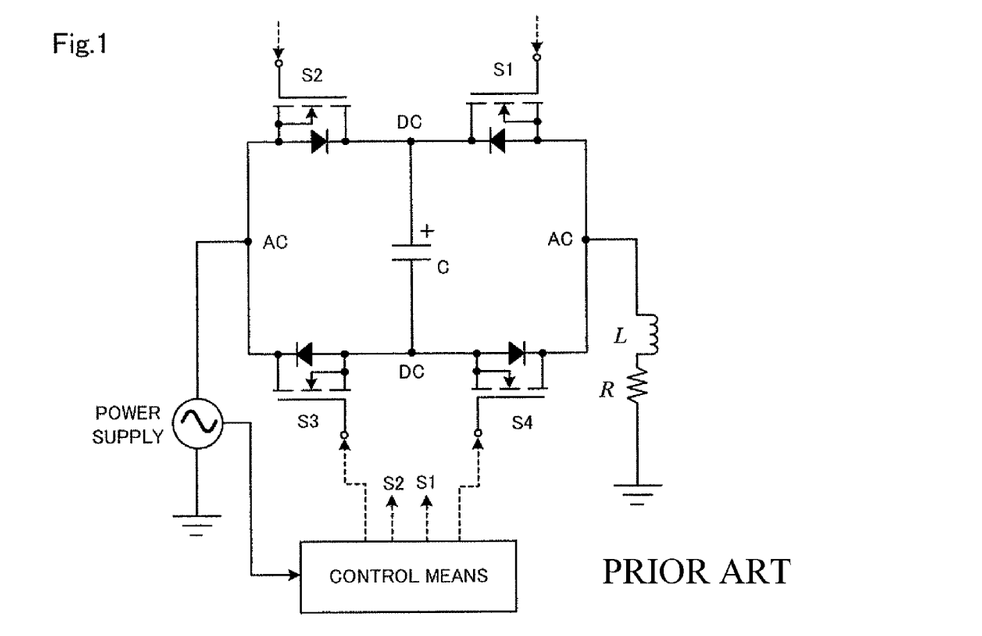
FIG. 1 shows an example of an AC power supply unit using a conventional magnetic energy recovery switch.

FIG. 1 shows an AC power supply unit using magnetic energy recovery switch of which a patent application has been filed and has also been publicized (see Unexamined Japanese Patent Application KOKAI Publication No. 2004-260991). In this structure, when a resistance component of the load R decreases for a short period of time transiently, a large current flows and magnetic energy increases, and the capacitor C cannot absorb any more magnetic energy and overvoltage takes place. At this time the reverse-conductive type semiconductor switches (S1-S4) are applied with the same voltage and may be destroyed when the voltage applied exceeds the withstand voltage thereof.

Figure 2:
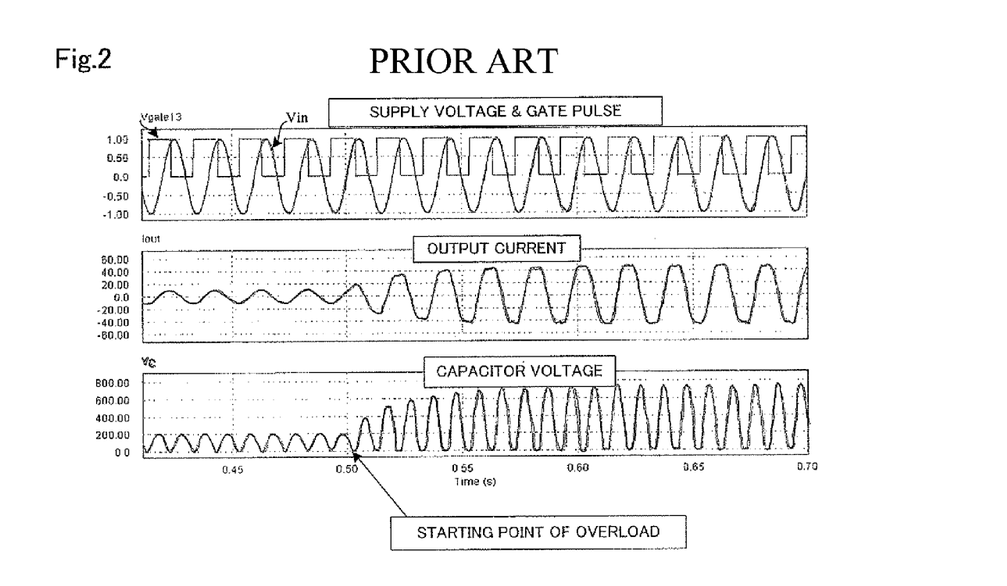
FIG. 2 shows results of simulation of the overvoltage and overcurrent generation.

FIG. 2 shows, by computer simulation, that when a resistance component of the load R decreases to a half and an overcurrent flows and, as a result, voltage of the capacitor rapidly increases. The peak of the capacitor voltage rises from 200V to 700V 0.5 seconds after the accident took place. This shows that the merit of affordability of a smaller-sized capacitor thanks to the confined requirement to store solely the magnetic energy of the load, can serve as a demerit of less energy absorption capacity in case of an overcurrent.

In order to protect this kind of reverse-conductive type semiconductor switches, it is easy to stop the operation thereof by moving to a bypass mode (short-circuit). This will end up in stopping the operation of all the loads and leads to stop, at the same time, operation of the other machinery which are connected and in the midst of operation. This was considered unavoidable before. This magnetic energy recovery switch is provided with an energy storage capacitor which recovers magnetic energy with four reverse-conductive type semiconductor switches, and can set freely timings for breaking and making of the circuit. If an operation control method which will utilize such merit fully enough is taken, it is possible to achieve stopping and/or limiting the current with the maximum capacity without merely breaking the circuit at the time of overcurrent, and returning to normal condition when the cause of the overcurrent is removed. This means that the magnetic energy recovery switch can serve as a highly-functional AC switch.

The present invention is realized in consideration of the above described conditions, and it is an object of the present invention to provide a magnetic energy recovery switch having a protective circuit for protecting the magnetic energy recovery switch against overvoltage and/or overcurrent caused due to an abnormality and/or a trouble of the load.

Means for Solving the Problem

The present invention relates to a magnetic energy recovery switch having a protective circuit and interposed between an AC power supply and a load to protect, against overvoltage and overcurrent, the magnetic energy recovery switch having a variable reactance function for turning the ON/OFF of the AC current and changing a phase thereof. The above object of the present invention will be achieved by a magnetic energy recovery switch having a protective circuit, the magnetic energy recovery switch comprising:

a bridge circuit constructed from four reverse-conductive type semiconductor switches;

a capacitor connected between DC terminals of the bridge circuit, recovering and storing magnetic energy at cut off of a current by repetitiously changing voltage from substantially zero to a peak voltage at twice as much frequency of the AC current in normal condition; and control means;

wherein the protective circuit comprises:

a voltage detection unit connected in parallel with the capacitor to detect a voltage of the capacitor; and a discharge circuit connected in parallel with the capacitor and having a discharge resistor and a discharge switch connected in series; and a current detection unit interposed between the AC power supply and the load and detecting a current flowing to the load;

wherein the control means controls a phase of a gate control signal such that each of the four reverse-conductive type semiconductor switches is controlled so as to be paired with diagonally opposed one, such that the diagonally opposed pair of the reverse conductive type semiconductor switches are simultaneously turned ON/OFF in synchronization with the voltage of the AC power supply; controls the gate of the discharge switch so as to short-circuit the discharge switch to discharge the electric charge of the capacitor through the discharge resistor when an output of the voltage detection unit exceeds a predetermined value; and controls to limit a current by making the duty ratio of the ON/OFF of the pulse of the control signals smaller than 0.5 when the output of the current detection unit exceeds a predetermined value.

Also the above object of the present invention can be achieved by a magnetic energy recovery switch having a protective circuit, wherein the protective circuit further comprises a current detection unit interposed between the AC power supply and the load and detecting the current which flows to the load; and the control means controls to limit a current by making the duty ratio of ON/OFF of the pulse of the control signals smaller than 0.5 when the output of the current detection unit exceeds a predetermined value.

Moreover the above object of the present invention can be effectively achieved by making the control means controls the gates of the four reverse conductive type semiconductor switches so as to turn OFF all the four reverse-conductive type semiconductor switches to cut off the current when a cumulative length of time during which the output of the voltage detection unit is in excess of a predetermined value exceeds a predetermined time period; or by making the control means control the gates so as to turn ON, when the capacitor voltage is zero, all the four reverse-conductive type semiconductor switches, to achieve a bilateral conducting state.

Furthermore, the above object of the present invention can be effectively achieved by making the protective circuit further comprises a current detection unit interposed between the AC power supply and the load to detect the current which flows to the load, wherein the control means controls the gates so as to turn OFF all the four reverse-conductive type semiconductor switches to cut off the current, when the output of the current detection unit exceeds a predetermined value; or the control means controls the gates so as to turn OFF only one reverse-conductive type semiconductor switch of the opposed pair of the reverse-conductive type semiconductor switches of the bridge which are ON to cut off the current when the output of the current detection unit exceeds a predetermined value.

BEST MODE FOR CARRYING OUT THE INVENTION

Figure 3:
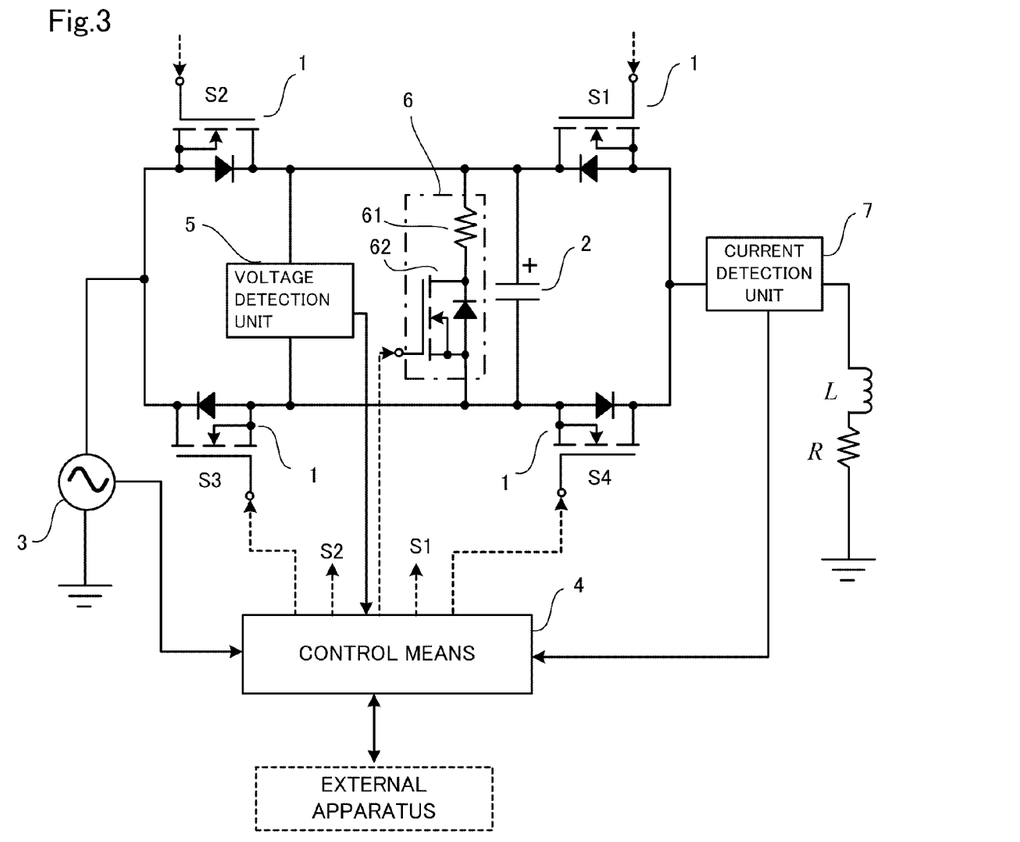
FIG. 3 is a circuit block diagram showing a structure of a magnetic energy recovery switch having a protective circuit according to the present invention.

This invention relates to a magnetic energy recovery switch having a protective circuit to protect magnetic energy recovery switch against overvoltage and/or overcurrent. FIG. 3 shows a preferable embodiment of the present invention.

The magnetic energy recovery switch (hereinafter, MERS) provided with a protective circuit of the present invention comprises a bridge circuit constructed from four reverse-conductive type semiconductor switches (hereinafter, semiconductor switches) S1-S4, a capacitor 2 connected between DC output terminals of the bridge circuit for recovering and storing the magnetic energy (snubber energy) of the circuit when the current is cut off, and control means 4 for controlling the phase of the gate control signals so as to turn simultaneously ON/OFF diagonally opposed pairs (S1 and S3, S2 and S4) of the semiconductor switches of the bridge. This MERS is interposed in series between an AC power supply 3 and loads (L, R).

The protective circuit for protecting MERS against overvoltage and/or overcurrent comprises a voltage detection unit 5 connected in parallel with the capacitor 2 for detecting the voltage of the capacitor 2 and a discharge circuit 6 connected in parallel with the capacitor 2 and having a discharge resistor 61 and a discharge switch 62; and the ON/OFF of the discharge switch 62 is controlled by the gate control signals supplied from the control means 4. More concrete explanation is that an output of the voltage detection unit 5 is inputted into the control means 4, and the output value is compared with a threshold value previously stored at the control means 4. When the output of the voltage detection unit 5 exceeds the threshold value, that is, when the capacitor has an overvoltage, the control means 4 sends ON signal to the gate of the discharge switch 62 to short-circuit the discharge switch 62 for discharging electric charge of the capacitor 2 through the discharge resistor 61 to reduce the capacitor voltage; and the control means 4 sends OFF signal to the gate of the discharge switch 62 and the discharge switch gets turned OFF, when the capacitor voltage returns to a value within a normal value area. Power MOSFETs and IGBTs or the like can be used for semiconductor switches.

Figure 4:
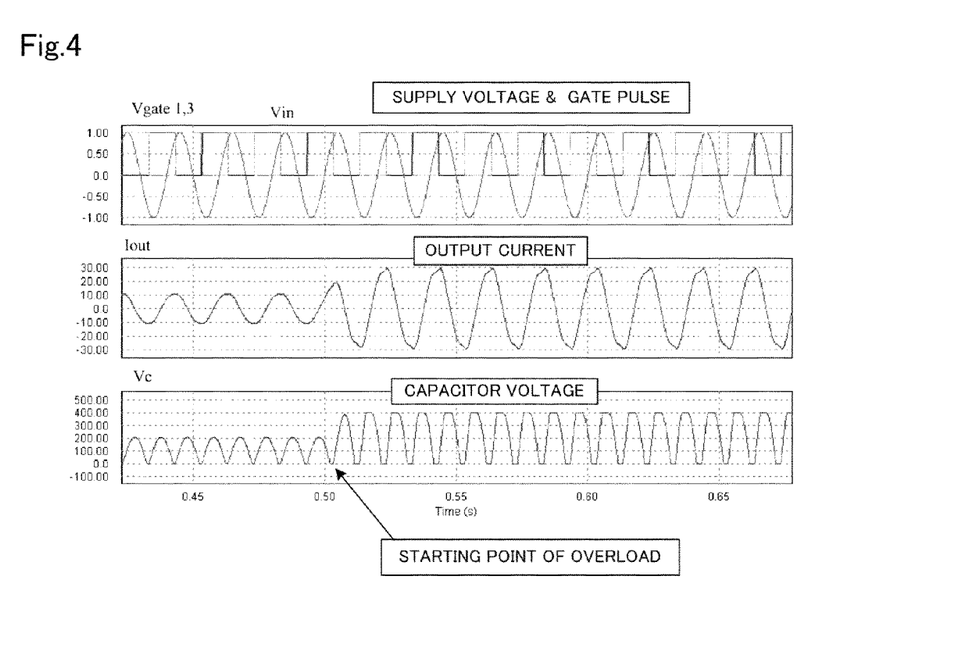
FIG. 4 shows a disruption in the current wave form due to a step change in a gate control phase.

In case that a discharge circuit 6 for protecting the capacitor 2 by discharging the capacitor 2 is added, when the capacitor voltage exceeds 400V as shown in FIG. 4, the discharge switch 52 is turned ON to operate the discharge circuit 6 to discharge the current to the discharge resistor 61, thereby preventing the capacitor voltage from exceeding 400V. What is important is that as a result of the reduced capacitor voltage, the reactance voltage is also reduced and, therefore, the rising of the load current is also reduced due to the limitation of the capacitor voltage. It is a characteristic of the overcurrent of the magnetic energy recovery switch that the capacitor voltage rises rapidly, and if the capacitor voltage is reduced, the current does not rise. This is essentially different from the protection of a capacitor against overvoltage by the conventional inverter device.

Figure 5:
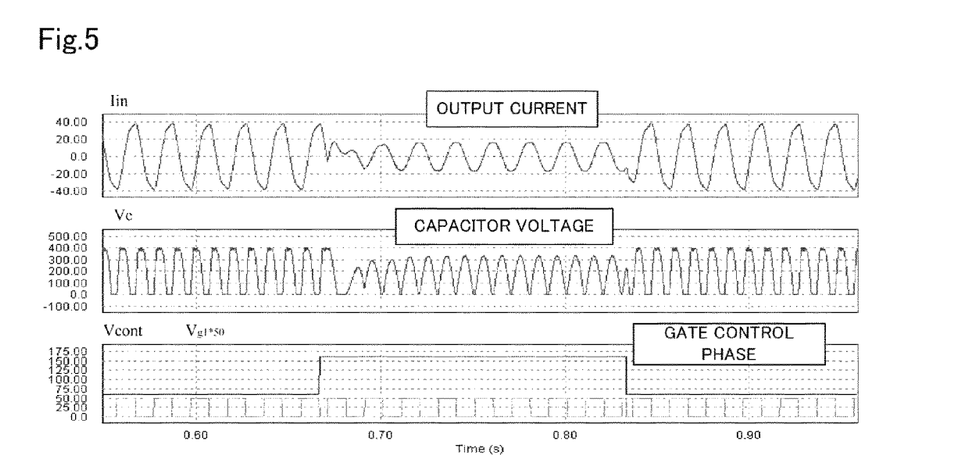
FIG. 5 shows a current control by controlling the duty ratio of a gate pulse.

As another means it may be possible that when a magnetic energy recovery switch or a capacitor exceeds a withstand voltage, the phase of the gate control signals of the magnetic energy recovery switch is further advanced to reduce shared voltage of the load. However, controlling cycle of the phase of the gate pulse is a half cycle in synchronization with the power supply, therefore, the change of the ON/OFF phase which is close to the phase speed makes the ON time of the gate longer than a half cycle and generates a DC component at a load, which is not desirable. For a change in ON/OFF phase it is necessary to put a time consonant of more than 10 mS. The result will appear one cycle after. As for controlling the change in the output of the load, the normal control as described above is enough. However in the case of an overcurrent due to an accident or the like, the speed of increasing current is faster than one cycle and the response is not in time. FIG. 5 shows simulation results illustrating that because of a rapid change in the phase of the gate signals, pulses are lacking and there is a disruption in the output current wave form.

In another preferable embodiment of the protective circuit of the present invention, a method to reduce the pulse width of the ON signal of the gate (that is, to make the duty ratio of the gate pulse signal smaller than 0.5) is taken.

That is, detection of a current flown to the load is carried out by the current detection unit 7 interposed between the AC power supply 3 and the load, and when the output of the current detection unit 7 exceeds a predetermined value, the control means 4 controls to make the ON/OFF duty ratio of the pulse of the gate control signals of the semiconductor switch 1 smaller than 0.5, thereby carrying out a current limiting control.

By combining the discharging of the capacitor by the discharge circuit 6 with the current limiting control through making the ON/OFF duty ratio of the pulse of the gate control signals of the semiconductor switches 1 smaller than 0.5, protection function of the MERS is further improved.

Figure 6:
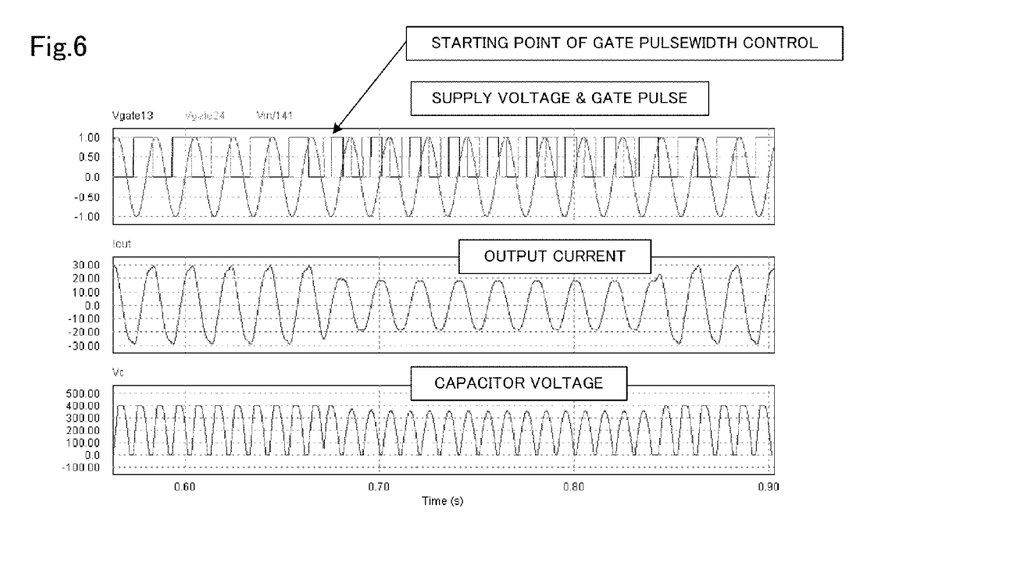
FIG. 6 shows a current control by protection against an overvoltage.

FIG. 6 shows results of a simulation in which the pulse width of ON signal is rapidly reduced from 180° after 0.65 seconds and made return to the normal width after 0.85 seconds. Although the pulse width was reduced rapidly, the current wave form was not disrupted and the current was decreased.

After all, the combination of the protection function against overvoltage by a voltage peak cut for the capacitor and current limiting function by the pulse width control of the ON signal of the gates can be widely applicable as protection method for MERS, and yet protection is possible only through such a combination in this instance.

The present invention is provided with, against an instantaneous overvoltage, a discharge circuit 6 for discharging electric charge of the capacitor which is overcharged, and, first of all, protection is carried out for the overvoltage of the capacitor 2 and the semiconductor switch 1 by a most simple and effective means. Unlike a voltage-type converter, the short-circuit of MERS provides no problem as the AC power supply 3 and the load are just connected in series. Discharge resistor 61 may be determined by the current capacity of the discharge circuit 6 and also by the heat capacity of the discharge switch 62; however, 10 times or 20 times the on resistance of the discharge switch 62 will be one standard. In the embodiment 10Ω is used.

It is possible to use a thyristor for this discharge switch 62 which, however, will stop the operation as MERS and the leading reactance voltage will become zero and, therefore, the reactance on the whole becomes large. This is a function as a current limiter, and is an important function. However, as the energy of the capacitor is completely discharged, the capacity of the discharge resistor 61 must be enlarged. Also voltage non-linear element such as ZNR or CYDAC may be used instead of the discharge switch 62.

The control means 4 of the MERS decreases the pulse width of the ON signals of the gates either by an overvoltage signal when an overvoltage is detected or by an overcurrent signal when an overcurrent is detected, or by the combination of both signals. By including to allow the signal to be instantaneously changed to OFF from ON, the rising of voltage stops and load current is lowered under the overcurrent protection level by current feed back control. The overvoltage of the capacitor is also lowered under the protection level. It is new that the discharge by the discharge switch 62 and the current feed back control by controlling the duty ratio of the gate pulse are combined, thereby making the MERS operate as a current limiter through the current limiting control is possible without semiconductor switches thereof getting destroyed. As a result, when the start-up rush of the load is over, MERS can return to the normal operation automatically, which marks an important starting point for MERS to possess a more intelligent function in addition to turning ON/OFF the switch. The current limiting operation at the time of an accident has been being researched centering on a variety of current limiters and such research has not been accomplished yet. The MERS of the present invention is an ideal AC current switch and, therefore, the present invention can provide a semiconductor-type static current limiter which can limit the current by reducing the capacitor voltage even when gates are all turned OFF. Such operation became possible owing to the advancement of the semiconductor, and when IGBT especially developed for MERS with conduction loss of 1.54V (the same with thyristor) is used as AC semiconductor switch, such an intelligent AC semiconductor switch can be provided as normal conduction loss thereof is small, and it is not necessary to stop operation for the protection at the time of accident or for the only initial start-up rush current, and the operation can be continued and wait for the transient condition to pass limiting the current within the overload capacity predetermined for the circuit.

FIG. 3 shows an embodiment of the present invention, in which semiconductor switches 1 are arranged in a bridge structure and a capacitor 2 for storing the magnetic energy is connected between the DC terminals. Unlike the capacitor of the conventional voltage type inverter, this capacitor is only for storing the magnetic energy of the load and, therefore, the capacity of the capacitor can be small. It is a characteristic of this capacitor that at an each half of the cycle the voltage reaches a peak and becomes zero voltage through a discharge. The wave form of the current for charging and discharging should be approximated to the angular velocity $\omega_0$. As a result, higher harmonics decrease. The relation between the capacitance C and the AC inductance L is as follows:

$$LC = \omega_0^{-2} \qquad \text{(equation 1)}$$

Moreover, by making the value of the capacitance C slightly smaller than the value acquired from the above equation, there is a period generated when there is no voltage after the discharge of a half cycle, thereby switching of semiconductor switches 1 becomes easier. It is a characteristic that the voltage supply capacitor of a single-phase inverter has, unlike the conventional PWM converter, a drastically small capacitance.

As the voltage of the capacitor 2 oscillates with the gate cycle, protection against an overvoltage must be carried out in a high speed. If the capacitor voltage detected by the voltage detection circuit 5 is likely to exceed the threshold value, the voltage is discharged by the discharge resistor 61 for the current limiting or the like; as a result, the voltage of the capacitor remains at the value without exceeding the threshold value.

Also receiving separately the detection signal from the current detection circuit 7, the pulse width of the ON signals of the gates (duty ratio) is made smaller than 0.5 in order to keep the threshold value of the overcurrent.

An explanation will be given using the simulation results in FIG. 7. When the detected current exceeds the threshold value, the control means makes the duty ratio of the gate control pulse smaller than 0.5, thereby reducing the ON time of the gates. This does not bring about effects thereof instantaneously, and the discharge circuit 6 for the capacitor is also necessary. When the current exceeds the threshold value, the OFF time of the gates of the semiconductor switches 1 becomes longer (the pulse width of ON becomes narrow). As a result, the semiconductor switches 1 serve as a current limiter. The maximum inverse voltage generated is a voltage of the protection level for the capacitor.

As the capacitor's withstand voltage is larger than 1.4 times the supply voltage, the current reduces.

The control means 4 has a capacity to detect the voltage phase of the AC power supply 3 and sends out gate signals necessary for the four semiconductor switches 1. Although the control means sends gate signals simultaneously to the pair of S1 and S3 and to the pair of S2 and S4 of opposing semiconductor switches, the control means does not send ON signals to the two pairs simultaneously. It is because the capacitor voltage gets short-circuited.

Figure 7:
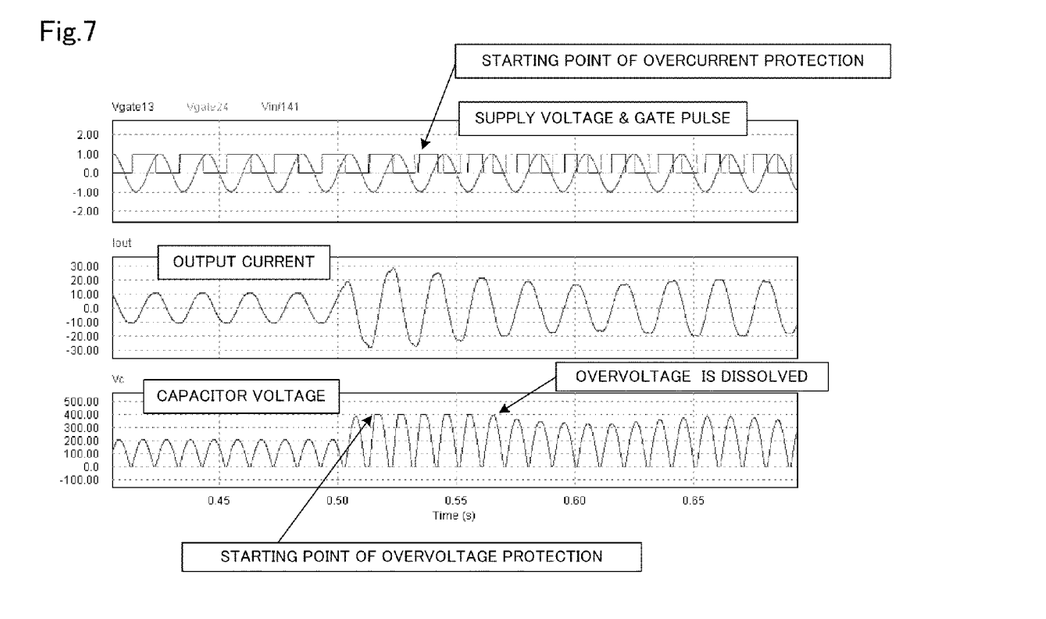
FIG. 7 shows a simulation model and results thereof.

The relation between the AC supply voltage and the gate pulse signals is shown in the top trace in FIG. 7. Here the width of the gate pulse signal is kept at the same cycle of the basic wave, and the duty ratio is controlled so that only the ON time is shortened.

In this instance, the overcurrent makes the magnetic (snubber) energy unexpectedly large, and the capacitor has an overvoltage once; such period, however, is a short time period before the current limiting function brings about an effect after a few scores of micro seconds. This way it is important to send a limited electric power without stopping the switches even at the time of an accident by means of a protective circuit combining instantaneous voltage limiting function (discharge) and overcurrent inhibition function for removing the reasons for the overvoltage.

Simulation of an Embodiment

Figure 8:
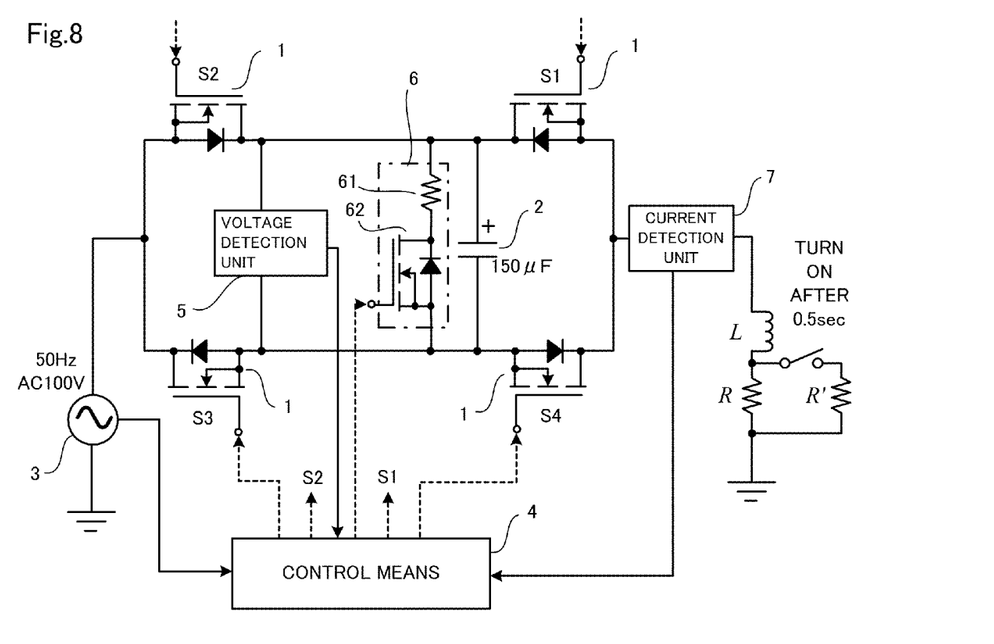
FIG. 8 is a circuit block diagram for a simulation.
Figure 9:
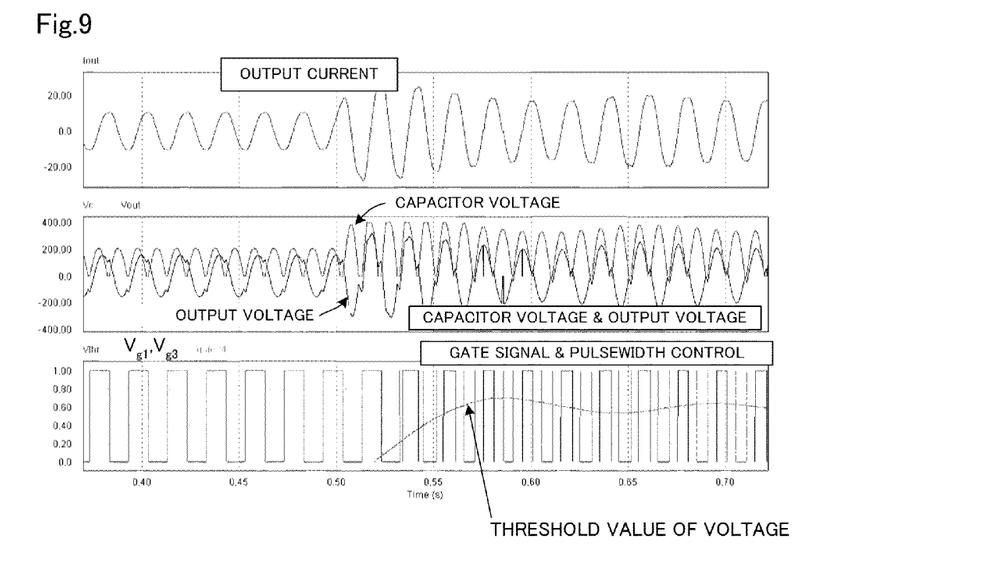
FIG. 9 shows analytical results obtained by a simulation.

FIG. 8 shows a circuit block diagram for a simulation and FIG. 9 shows analyzed results thereof. The circuit consonants are as follows:

1. semiconductor switches: S1, S2, S3, S4 (Power MOSFETs; conducting loss is ignored.)
2. AC power supply: 50 Hz, AC 100V
3. load inductance L: 31.85 mH
4. load resistance R: 10Ω
5. load resistance at abnormal time R': 2Ω
6. duration: 0.1 s
7. capacitor: 150 μF, overvoltage protection level (threshold value) 400V A case in which a load resistance value is drastically changed after 0.5 seconds thereby causing a rapid increase in the current is simulated. As a result of the increase in the current, the capacitor now has an overvoltage and the discharge circuit gets in motion and the voltage is cut at 400V. When the overcurrent is detected by the current detection unit 7, the pulse width of the gate ON signals is reduced and after 0.1 seconds the current reduced, and, as a result, the overvoltage was dissolved.

Figure 10:
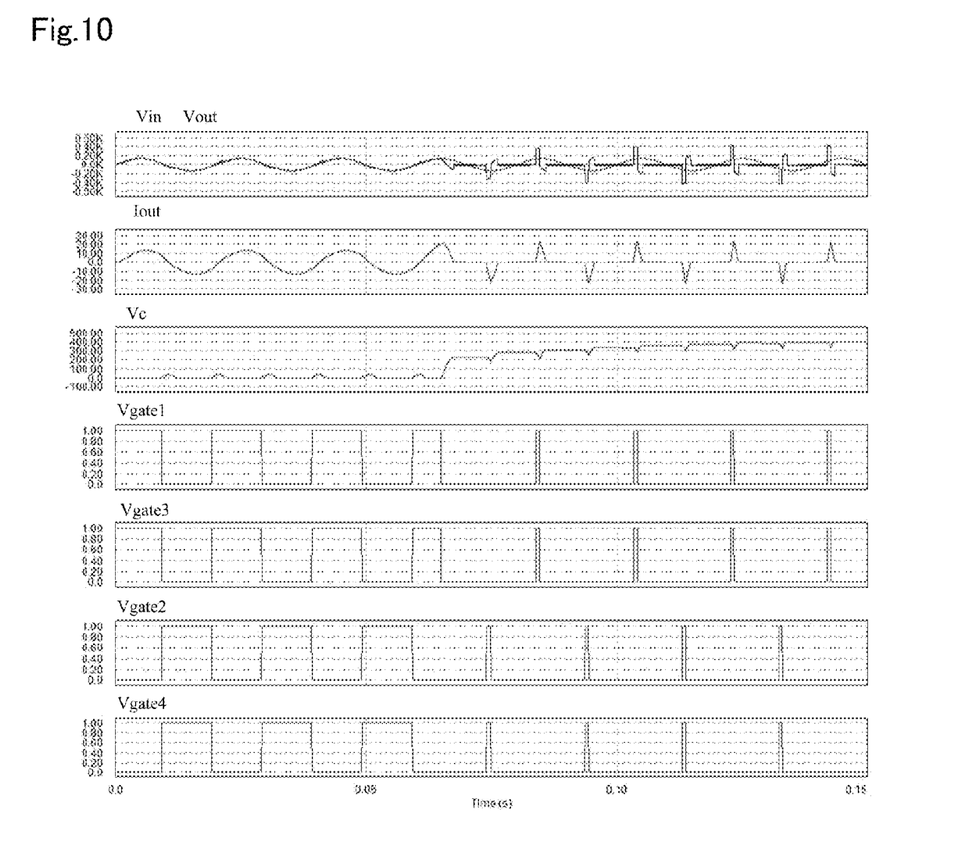
FIG. 10 shows effects of turning OFF all the gates by simulation.

Also watching an instantaneous value of the current is carried out and when the current exceeds a predetermined value, all the gates are turned OFF, and the rising of the current can be turned to decreasing. Effects of the turning OFF of all the gates are shown in simulation in FIG. 10. This has a great effect when the load is resistive. In the circuit of FIG. 8, when the resistive component of the load (L=10 mH, R=10Ω, R'=10Ω) has, after 0.06 seconds, become a half from 10Ω to 5Ω, the switch current rises. A watch level is set to 20 A, and the simulation results of a case in which all the gates of S1, S3 and S2, S4 are turned OFF, when the current is detected to be 20 A, are shown. As a result, the rising of the current stops at 20 A, thereby protecting the switch.

Figure 11:
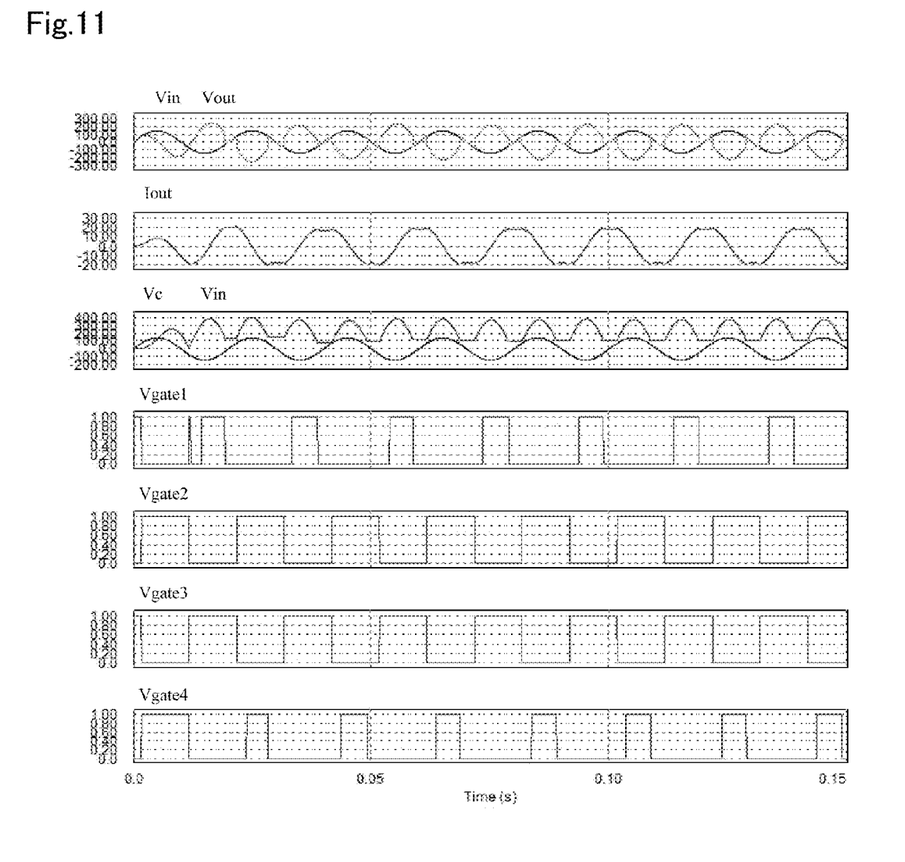
FIG. 11 shows simulation results about a control through stopping the gates of S1 and S4 when an instantaneous value of the current exceeds a predetermined value.

Moreover, when the gate signal for one of the opposed pair of the switches is stopped, the capacitor current is stopped and the capacitor discharge is stopped and voltage decrease stops. Especially when the load is inductive, the rising of the current also stops and, as a result, something like a current limitation becomes possible. This can be utilized, when the load is inductive, as a generating device of leading current (SVC: Static VAR Compensator) for controlling the leading current. Computer simulation results of controlling by turning off the gates of S1 and S4, when the instantaneous value of the current exceeds a predetermined value, are shown in FIG. 11. The circuit used for this simulation has a similar circuit as in FIG. 8 and when an inductive load (L=30 mH, R=10Ω, R'=0.5Ω) is connected, the current limiting is possible by turning OFF one gate of the pair at 15 A, for example. This is a control for a case of the load with a low power factor or for a case of acquiring leading current by flowing the current through a coil. The current control is carried out by turning OFF the gates of S1 and S4 at 15 A.

The discharge resistor 61 has to withstand the rising temperature when the input energy becomes excessively large. In this embodiment, however, discharge current is flown only during such time period as the capacitor voltage exceeds a predetermined voltage. When the discharge resistor 61 becomes overloaded, two methods remain as the final protection.

One of them is to stop all the current by turning OFF the gates of all the switches of the MERS as described above, and the other is to short-circuit the MERS. In this instance the capacitor voltage decreases to zero or almost zero at the frequency twice the gate frequency. Aiming at this timing when the voltage is close to zero, gate signals now turn ON/OFF simultaneously different pairs of S1, S2 and S3, S4 while the gate signals used to be given simultaneously to the opposed pairs of the semiconductor switches until then. This way the AC current now comes to be in a bypass condition and yet the capacitor charge can remain without being short-circuited when the change-over is carried out.

This embodiment was explained with a single phase circuit; however, by using three sets of MERS, an embodiment naturally can be applied to a three-phase AC. In this instance there is such an effect as the harmonics of a tertiary current by the Star-Delta Transformation disappear. Furthermore, response at the time of an unbalance accident of the three-phase is possible.

The control means of this protective circuit has a capability to judge rationality of the control signals from outside. First of all is that there is an identification number for an individual switch and this can be a key for the communication with outside. This function, for example, can make it possible that when radio signals are sent out to the switch via communication system such as Internet, the switch, then, becomes to be able to be controlled by radio control; and, thus, control signals can be conveyed without wire connection.

The control means of this protective circuit acquires not only the current, voltage, phase, power factor but also has a function to find out an abnormality through checking the soundness from impedance acquired from voltage and current. Moreover it is possible to control semiconductor switches accordingly in response to the operational condition of the load acquired from the computation.

The control means of this protective circuit stores the operational conditions of these semiconductor switches in the past and it may be possible to send out information to outside in response to a request therefrom by integrating the total operation time, the electric power, the consumed electric power or the like.

This protective circuit has the common function for all the MERS even with loads having different capacities and objects. This protective circuit will be required and by producing the circuit separately from the main circuit, it is possible to realize a cost down by the effect of a mass production; so it is better to standardize the circuit and also to make structure thereof easy to be attached.

As the control means of this protection circuit has a programmed computing function, it is possible to make the content downloaded and uploaded via communication function from outside. It is also possible to reflect the characteristics and operation plan of the load in the program.

The control means of this protective circuit has a control computing function and a storage function, and, therefore, in the case of application thereof to a lighting fixture, it is possible to control the fixture through detecting the luminance of the floor surface or making the luminous efficiency a function in a case of a fluorescent lamp or the like when the luminous efficiency changes according to the outside temperature.

The invention claimed is:

1. A magnetic energy recovery switch having a protective circuit and interposed between an AC power supply and a load to protect, against an overvoltage or an overcurrent, a magnetic energy recovery switch with a variable reactance function for turning ON/OFF of the AC current and changing a phase thereof, the magnetic energy recovery switch comprising:
   a bridge circuit constructed from four reverse-conductive type semiconductor switches;
   a capacitor connected between DC terminals of the bridge circuit, recovering and storing magnetic energy at cut off of a current by repetitiously changing voltage from substantially zero to a peak voltage at twice as much frequency of the AC current in normal condition; and
   control means;
   wherein the protective circuit comprises:
   a voltage detection unit connected in parallel with the capacitor and detecting a voltage of the capacitor;
   a discharge circuit connected in parallel with the capacitor and having a discharge resistor and a discharge switch connected in series; and
   a current detection unit interposed between the AC power supply and the load and detecting a current flowing to the load;
   wherein the control means controls a phase of a gate control signal such that each of the four reverse-conductive type semiconductor switches is controlled so as to be paired with diagonally opposed one, such that the diagonally opposed pair of reverse-conductive type semiconductor switches are simultaneously turned ON/OFF in synchronization with the voltage of the AC power supply; controls the gate of the discharge switch so as to short-circuit the discharge switch to discharge the electric charge of the capacitor through the discharge resistor when an output of the voltage detection unit exceeds a predetermined value; and controls to limit a current by making the duty ratio of the ON/OFF of the pulse of the control signals smaller than 0.5 when the output of the current detection unit exceeds a predetermined value.

2. The magnetic energy recovery switch having a protective circuit according to claim 1, wherein the control means controls gates of the four reverse conductive type semiconductor switches so as to turn OFF all the four reverse conductive type semiconductor switches to cut off the current when a cumulative length of time during which the discharge switch is short-circuited exceeds a predetermined length.

3. The magnetic energy recovery switch having a protective circuit according to claim 1, wherein the control means controls the gates so as to turn ON all the four reverse-conductive type semiconductor switches to make the bilateral conducting state of the current when the capacitor voltage is zero.

4. The magnetic energy recovery switch having a protective circuit according to claim 1, wherein the control means controls the gates so as to turn OFF all the four reverse-conductive type semiconductor switches when the output of the current detection unit exceeds a predetermined value.

5. The magnetic energy recovery switch having a protective circuit according to claim 1, wherein the control means controls the gates so as to turn OFF only one of the two pairs of opposed reverse-conductive type semiconductor switches that is turned ON to cut off the current, when the output of the current detection unit exceeds a predetermined value.

6. The magnetic energy recovery switch having a protective circuit according to claim 1, wherein the control means comprises a communication unit to perform communication with an external device.

7. The magnetic energy recovery switch having a protective circuit according to claim 2, wherein the control means comprise a communication unit to perform communication with an external device.

8. The magnetic energy recovery switch having a protective circuit according to claim 3, wherein the control means comprise a communication unit to perform communication with an external device.

9. The magnetic energy recovery switch having a protective circuit according to claim 4, wherein the control means comprise a communication unit to perform communication with an external device.

10. The magnetic energy recovery switch having a protective circuit according to claim 5, wherein the control means comprise a communication unit to perform communication with an external device.

11. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 1 connected in series between the AC power supply for generating the AC current and the load.

12. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 2 connected in series between the AC power supply for generating the AC current and the load.

13. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 3 connected in series between the AC power supply for generating the AC current and the load.

14. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 4 connected in series between the AC power supply for generating the AC current and the load.

15. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 5 connected in series between the AC power supply for generating the AC current and the load.

16. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 6 connected in series between the AC power supply for generating the AC current and the load.

17. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 7 connected in series between the AC power supply for generating the AC current and the load.

18. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 8 connected in series between the AC power supply for generating the AC current and the load.

19. An AC power supply unit for supplying an AC current to a load and recovering a magnetic energy at a time when a current is cut off and utilizing such recovered energy as supply current to the load, wherein the AC power supply unit has the magnetic energy recovery switch having the protective circuit according to claim 9 connected in series between the AC power supply for generating the AC current and the load.

* * * * *